United States Patent [19]
Ishii et al.

[11] Patent Number: 5,697,223
[45] Date of Patent: Dec. 16, 1997

[54] METHOD OF CONTROL FOR CAR AIR-CONDITIONER

[75] Inventors: Hiroki Ishii; Mikio Matsuda; Masaru Tsunokawa, all of Nishio; Akihisa Kokubo, Kariya, all of Japan

[73] Assignees: Nippon Soken, Inc., Nishio; Nippondenso Co., Ltd., Kariya, both of Japan

[21] Appl. No.: 574,046

[22] Filed: Dec. 18, 1995

[30] Foreign Application Priority Data

Dec. 19, 1994 [JP] Japan ................................. 6-315127

[51] Int. Cl.$^6$ .................................................. F25D 17/06
[52] U.S. Cl. ........................ 62/94; 62/176.1; 62/271; 165/231; 236/44 A
[58] Field of Search ......................... 165/231–233; 62/93, 94, 176.1, 271; 236/44 A, 44 C

[56] References Cited

U.S. PATENT DOCUMENTS 5,301,515  4/1994  Iritani et al. ..................... 62/272
5,509,275  4/1996  Bhatti et al. ..................... 62/94 X
5,566,880  10/1996  Khelifa et al. ..................... 62/94

FOREIGN PATENT DOCUMENTS 5-139142  6/1993  Japan.

*Primary Examiner*—Henry A. Bennett
*Assistant Examiner*—Susanne C. Tinker
*Attorney, Agent, or Firm*—Cushman, Darby & Cushman IP Group of Pillsbury Madison & Sutro LLP

[57] ABSTRACT

A method of control of a car air-conditioner which prevents condensation and fogging on window glass occurring at the initial start of a slow starting heat pump system, without dehumidification by a large amount of ventilation as in the past, by driving an absorbent fan simultaneously with the start of a heating operation by the system so as to remove the moisture from the air in the passenger compartment by a small amount of an absorbent, starting a low level of ventilation when the heat pump system has finished warming up, ending the dehumidification by the absorbent within a relatively short time, and starting the regeneration of the absorbent by supplying power to a heater.

8 Claims, 5 Drawing Sheets

METHOD OF CONTROL FOR CAR AIR-CONDITIONER

BACKGROUND OF THE INVENTION

1. Field of the Invention

The present invention relates to a method of control for a car air-conditioner, more particularly relates to a method of control for a car air-conditioner which uses a heat pump system for heating for defogging in the cold season and which is suited for use in, for example, an electric car.

2. Description of the Related art

An electric car, unlike ordinary cars, is not able to use the engine as a source of heat, so uses a heat pump system comprised of a refrigeration cycle (heat pump cycle) for the air-conditioner. In the cold season, when heating by this air-conditioner so as to defog the windows, since the heat pump system is slow to start after being turned on, the moisture from the driver or passengers or the moisture from the inside of the passenger compartment sometimes will still condense upon contact with the inside of the window glass and cause the glass to fog. If preventing this by defogging heating in the outside air mode (state of operation where the heat pump system is operated as a heater while taking outside air into the passenger compartment to replace the air in the compartment), it is necessary to first introduce a large amount of cold outside air into the compartment. At this time, the exact same volume of air in the compartment, heated by the heat pump system, as the introduced air is discharged outside, so a large amount of electricity is consumed for driving the ventilation fan and there is considerable waste of the electricity in driving the heat pump system.

Further, in an air-conditioner using a heat pump cycle, that is, a heat pump system, there is the defect of the heat pump cycle that when the temperature of the outside air is extremely low, frost builds up on the evaporator which comes in contact with the outside air in the heat exchanger constituting the heat pump cycle or the pressure conditions for the refrigerant required for operating the cycle cannot be secured and therefore the cycle capacity drops and defogging is not possible.

In the inside air mode (state of operation where the heat pump system is operated as a heater while circulating the air in the passenger compartment without introducing any outside air), defogging is not possible just by circulation of the inside air, so it is necessary to make use of another defogging means such as an absorbent. If trying to perform defogging just by an absorbent, however, a large amount of the absorbent would have to be used. This makes it unsuitable for an air-conditioner mounted in an electric car due to the weight and the space which would be occupied by the absorbent.

SUMMARY OF THE INVENTION

The present invention was made to deal with the above problems in the related art and has as its first object to provide a method of control for a car air-conditioner which solves these problems by a novel means using an absorbent while reducing the amount of the electricity used for the heating operation of the heat pump cycle.

Further, the present invention has as an object to provide a method of control for a car air-conditioner which enables defogging heating by the heat pump cycle even when the temperature of the outside air is extremely low, where the amount of the absorbent used is small and the weight and space occupied by the absorbent pose almost no burden on the electric car at all, and where regeneration of the absorbent is easy.

The present invention achieves the above objects by the provision of a method of control for a car air-conditioner which drives a fan for an absorbent to start the dehumidification of the air in a passenger compartment by the absorbent substantially simultaneously with the start of a heating operation of a heat pump system, starts exchange of the air in the passenger compartment by a low level of ventilation at the time when the heat pump system finishes warming up, then supplies power to an absorbent regeneration heater so as to regenerate the absorbent, and stops the supply of power to the heater and the fan for the absorbent when the regeneration is completed.

In the method of control for a car air-conditioner of the present invention, in addition to the heat pump system operating as the heater, provision is made of an absorbent and a related absorbent channel, a heater for regeneration of the absorbent, and a fan for the absorbent, so instead of starting the ventilation as in the past substantially simultaneously with the start of the heating operation of the heat pump system, the absorbent fan is driven to start the dehumidification of the air in the passenger compartment by the absorbent. When the heat pump system finishes warming up, the air in the compartment starts being replaced by a low level of ventilation. When the dehumidification by the absorbent is finished, power is supplied to the absorbent regeneration heater to start the regeneration. When the regeneration is finished, power stops being supplied to the heater and the absorbent fan.

According to the present invention, the absorbent is used for dehumidification in the initial startup period of the defogging heating of the car air-conditioner by the heat pump system and the large amount of ventilation required for dehumidification by just ventilation becomes unnecessary, so the amount of the electricity consumed for the ventilation can be reduced and the entry of cold air into the compartment can be prevented as well. Further, the time of use of the absorbent is short and the amount used is small as well, so the absorbent can be made small in volume and weight and can be easily mounted in even an electric car. Further, since the amount of the absorbent used is small, the electricity and time required for its regeneration become smaller.

BRIEF DESCRIPTION OF THE DRAWINGS

These and other objects and features of the present invention will become clear from the following description of preferred embodiments made with reference to the appended drawings, wherein.

DESCRIPTION OF THE PREFERRED EMBODIMENTS

Figure 1:
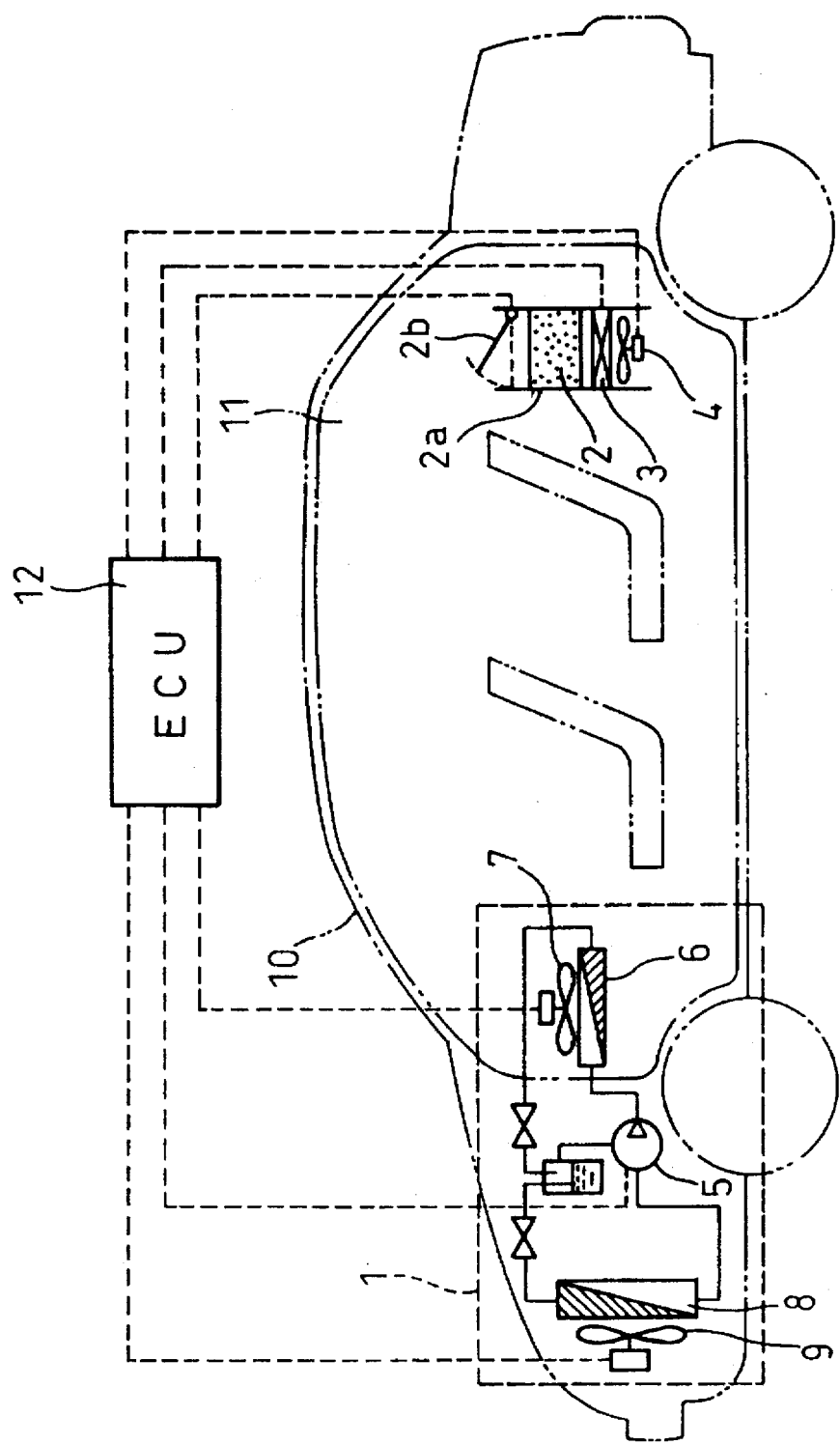
FIG. 1 is a schematic cross-sectional view of the configuration of a first embodiment of a car air-conditioner operated by the method of control of the present invention.

FIG. 1 shows the configuration of a first embodiment of a car air-conditioner operated by the method of control of the present invention. This air-conditioner is mounted in an electric car 10 and is comprised of a heat pump system 1 for drawing the heat of the outside air into the passenger compartment 11, a small amount of an absorbent 2 for absorbing for a short time the moisture contained in the air in the passenger compartment 11, an absorbent channel 2a with an inlet and outlet both opening in the passenger compartment 11 and forming a channel for the air in the passenger compartment passing through the absorbent 2, a heater 3 provided in the absorbent channel 2a which is supplied with power when causing moisture to leave the moisture-carrying absorbent 2 so as to regenerate the absorbent, and an absorbent fan 4 for forcibly sending air into the absorbent channel 2a so that the air in the passenger compartment 11 flows through the absorbent 2 during use of the absorbent 2 and its regeneration.

Further, the absorbent channel 2a in the illustrated embodiment is provided with a closing means such as a damper 2b downstream of the absorbent 2 for example to enable the absorbent 2 to be cut off from the air in the passenger compartment 11 at times other than use or regeneration of the absorbent 2. Of course, provision of the closing means such as the damper in the absorbent channel 2a upstream of the absorbent 2 as well is preferable in maintaining the ability of the regenerated absorbent 2 to absorb moisture for a long period.

While not shown, provision is also made of an outside air inlet and inside air outlet communicating the passenger compartment with the outside air to enable ventilation of the passenger compartment 11. These are provided with dampers for switching the flow of the air and controlling the flow or ventilation fans for forcing the flow. These functions, however, are possessed for example by the inside air circulation fan and the air channel provided with dampers around it which are generally provided in cars, so these may be used.

The air-conditioner, in this case, the heat pump system 1 serving as the heater, is comprised of a motor driven compressor 5 for compressing the refrigerant, a condenser 6 used as a heat exchanger for causing the compressed refrigerant to liquefy and supplying heat for the heating operation to the air in the passenger compartment, a motor driven inside air circulation fan 7 which enables air to be passed through the condenser 6 and can also serve as the above ventilation fan, an evaporator 8 serving as the heat exchanger for causing the refrigerant to evaporate and seize heat from the outside air, and a motor driven outside air distribution fan 9 for passing the outside air through the evaporator 8. The compressor 5, the motor of the inside air circulation fan 7, and the motor of the outside air distribution fan 9 are centrally driven or controlled by an electronic control unit (ECU) 12 together with the motor of the above-mentioned absorbent fan 4, absorbent regeneration heater 3, and not shown ventilation fan, dampers, etc. Needless to say, in the summer season, the heat pump system 1 can also operate as a cooler by switching the refrigerant channel.

Figure 2:
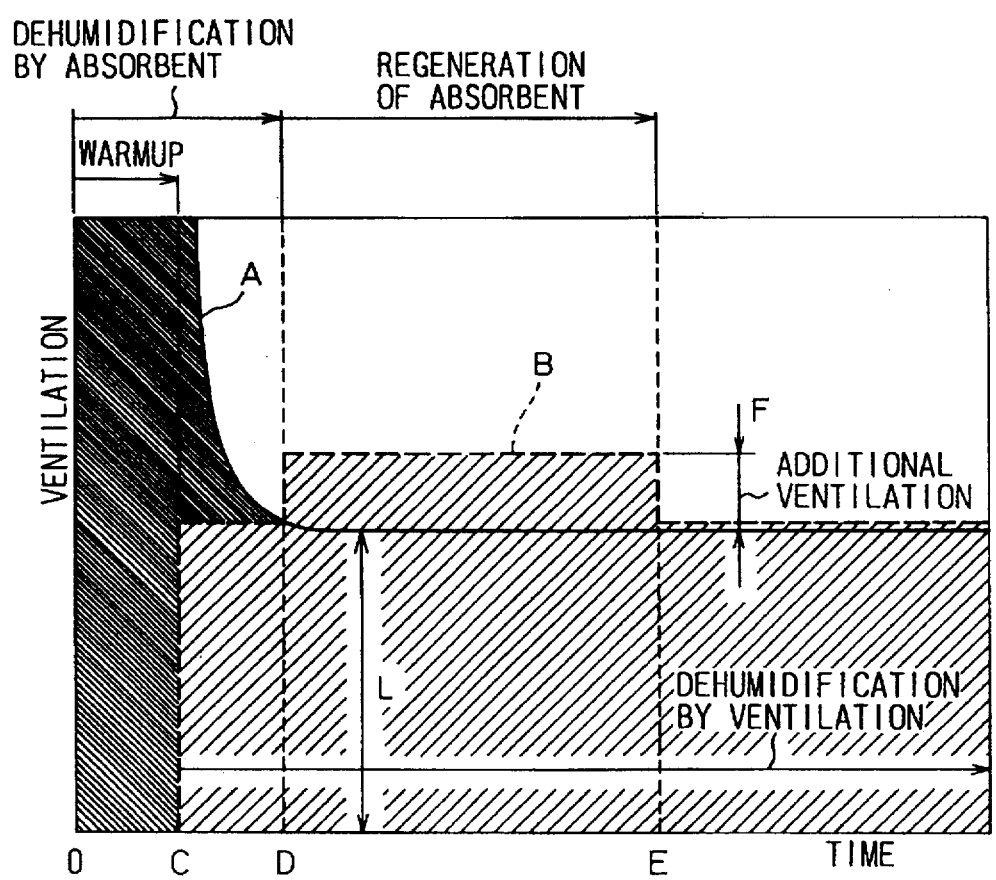
FIG. 2 is a graph for explaining the operation of the first embodiment and therefore an example of the method of control of the present invention.

To explain the method of control according to the present invention in more detail, an explanation will be made of an air-conditioner of the first embodiment shown in FIG. 1 with reference to FIG. 2. FIG. 2 shows the changes over time of the amount of ventilation in a defogging heating operation using as its horizontal axis the elapse of time and as its vertical axis the amount of ventilation, that is, the amount of outside air which is taken into the passenger compartment by the not shown ventilation fan or the inside air circulation fan 7 used instead of the ventilation fan by switching of the not shown air channel. In the figure, the line A shows the changes in the amount of ventilation required when dehumidifying the air in the passenger compartment by just ventilation, while the line B shows the changes in the amount of ventilation by the method of control of an air-conditioner of the first embodiment. In each case, the amount of electric power for driving the ventilation fan is indicated by the magnitude of the area of the hatched portions under the line A or line B.

When a driver or passenger enters the electric car 10, since the temperature of the window glass is low at first, the moisture coming off from the driver's or passenger's body condenses on the inside surface of the window glass to cause fogging. To dehumidify the passenger compartment, the air-conditioner of the first embodiment shown in FIG. 1, which serves also as the heater for dehumidifying the passenger compartment, is activated at the point 0 in FIG. 2. Due to this, the compressor 5 of the heat pump system 1 is driven and compresses the refrigerant. A given condition of a heat pump type of heater is that a considerably long (startup time (warmup time)) is required until a sufficient amount of refrigerant is compressed and a state is reached where the condenser 6 can supply heat for the defogging heating operation to the passenger compartment, so if the inside air circulation fan 7 is started early, low temperature air will be circulated in the passenger compartment, which will give an unpleasant feeling to the driver and passengers, and, also, condensation on the window glass will be aggravated.

In such a case, the method used in the past has been to dehumidify by just ventilation at the initial start of the heat pump system 1. That is, either the channel of the air has been switched so that outside air is fetched inside the passenger compartment 11 by the inside air circulation fan 7 or else the not illustrated specialized ventilation fan is used to take in the outside air and that outside air used to ventilate the passenger compartment 11. When the startup time passes, the heat pump system 1 can exhibit sufficient ability as a heater, so the amount of ventilation can be gradually reduced, but when the dehumidification is performed just by ventilization in the startup time of the heat pump system 1, an extremely large amount of ventilation is required at the start as shown by the line A in FIG. 2 and the power consumed for this becomes great. Further, there is the waste that part of the heat pumped into the passenger compartment by the heat pump system 1 is discarded in the outside air due to the ventilation.

As opposed to this, the air-conditioner of the first embodiment of the present invention is provided with a small amount of an absorbent 2 in the absorbent channel 2a. At the point of time 0 where the heat pump system 1 is activated as a heater, the ECU 12 issues a command to simultaneously drive the absorbent fan 4, open the damper 2b provided in the absorbent channel 2a, if any, and pass the air in the passenger compartment 11 through the absorbent 2, so there is no need to ventilate the passenger compartment right after the start of the heat pump system 1 and the air in the passenger compartment is dehumidified by the absorbent 2. Therefore, the moisture does not condense on the inside surface of the window glass to cause fogging.

In the case of the first embodiment, the dehumidification is performed by the absorbent 2 at the initial start of the heat pump system 1, so there is no ventilation performed at all from the start of the heat pump system 1 at the point of time 0 to the point of time C when the heat pump system 1 (in particular the condenser 6) finishes warming up (end of the startup period), that is, a complete inside air mode results.

The ventilation is started at the point of time C, but the amount of flow of the air L becomes low in level. As explained above, a special ventilation fan may also be used for the ventilation or the inside air circulation fan 7 may be used by switching the air channel. With this degree of low ventilation, the electric power consumed by the ventilation fan or by the inside air circulation fan 7 used for the ventilation is far smaller than the case of dehumidification by just ventilation from the start as clear from a comparison of the area under the line A in FIG. 2 and the area under the line B.

The point of time C is the point where the heat pump system 1 finishes warming up, so the inside air circulation fan 7 is activated to start the heating operation. When the temperature of the air in the passenger compartment rises, the window glass is warmed by the air in the passenger compartment rising in temperature, so condensation of moisture on the inside surface of the window glass, that is, fogging of the window glass, becomes difficult.

Even when dehumidifying only by ventilation as in the past, the amount of ventilation requires is reduced along with the warmup of the heat pump system 1, so the line A in FIG. 2 is drawn as a sharply falling line, but at the point of time where the line A showing the amount of ventilation required for dehumidification becomes about the same in extent as the amount of low level of ventilation started from the point C in the first embodiment, that is, at the point D, in the case of the first embodiment, the absorption of moisture by the absorbent 2 is stopped and the regeneration of the absorbent 2 is started. That is, in the first embodiment, the ECU 12 causes the absorbent regeneration heater 3 to be powered to give off heat while continuing to drive the absorbent fan 4 so as to heat the air sent into the absorbent 2 and cause the moisture to leave the absorbent 2. By stopping the use of the absorbent 2 early in this way and starting the regeneration of the absorbent 2 as fast as possible, it is possible to keep the volume of the absorbent 2 relatively small and to make the space and weight of it smaller and thereby facilitate mounting in an electric car 10.

The regeneration of the absorbent 2 proceeds rapidly due to the powering of the heater 3 and its heating. If the air containing the separated moisture is discharged into the outside air, however, there is a waste of energy, so in the first embodiment this air is returned into the passenger compartment 11 once again. To avoid a rise in the humidity in the passenger compartment 11 as a result of this, however, gradual dehumidification is performed by slightly increasing the amount of ventilation (additional ventilation F) as shown by the line B in FIG. 2. At the point of time E when the regeneration of the absorbent 2 is completed, the ECU 12 stops the motor of the absorbent fan 4, closes the closing means such as the damper 2b provided in the absorbent channel 2a, if any, and returns the amount of ventilation to the low level once again.

In this way, in the first embodiment, when the air-conditioner including the heat pump system 1 is activated at the point of time 0, the ECU 12 automatically performs the rest of the control operation. In this case, the optimal values of each of the warmup time (startup time, that is, period from 0 to C), the timing of start of regeneration (point of time D), the regeneration time (period from D to E), the low level ventilation L and additional ventilation F are determined for each model, so these are set in advance in the ROM of the ECU 12.

The car air-conditioner of the first embodiment does not require the large amount of ventilation required in the initial startup period of a defogging heating operation by the heat pump system 1 and therefore can reduce the amount of power consumed for the ventilation, can hold down the amount of cold air blown into the passenger compartment, and uses a small amount of the absorbent 2 and thereby enables easy mounting in an electric car in terms of space and weight. Further, since the amount of the absorbent 2 used is small, the power and time required for regenerating it also become smaller.

Figure 3:
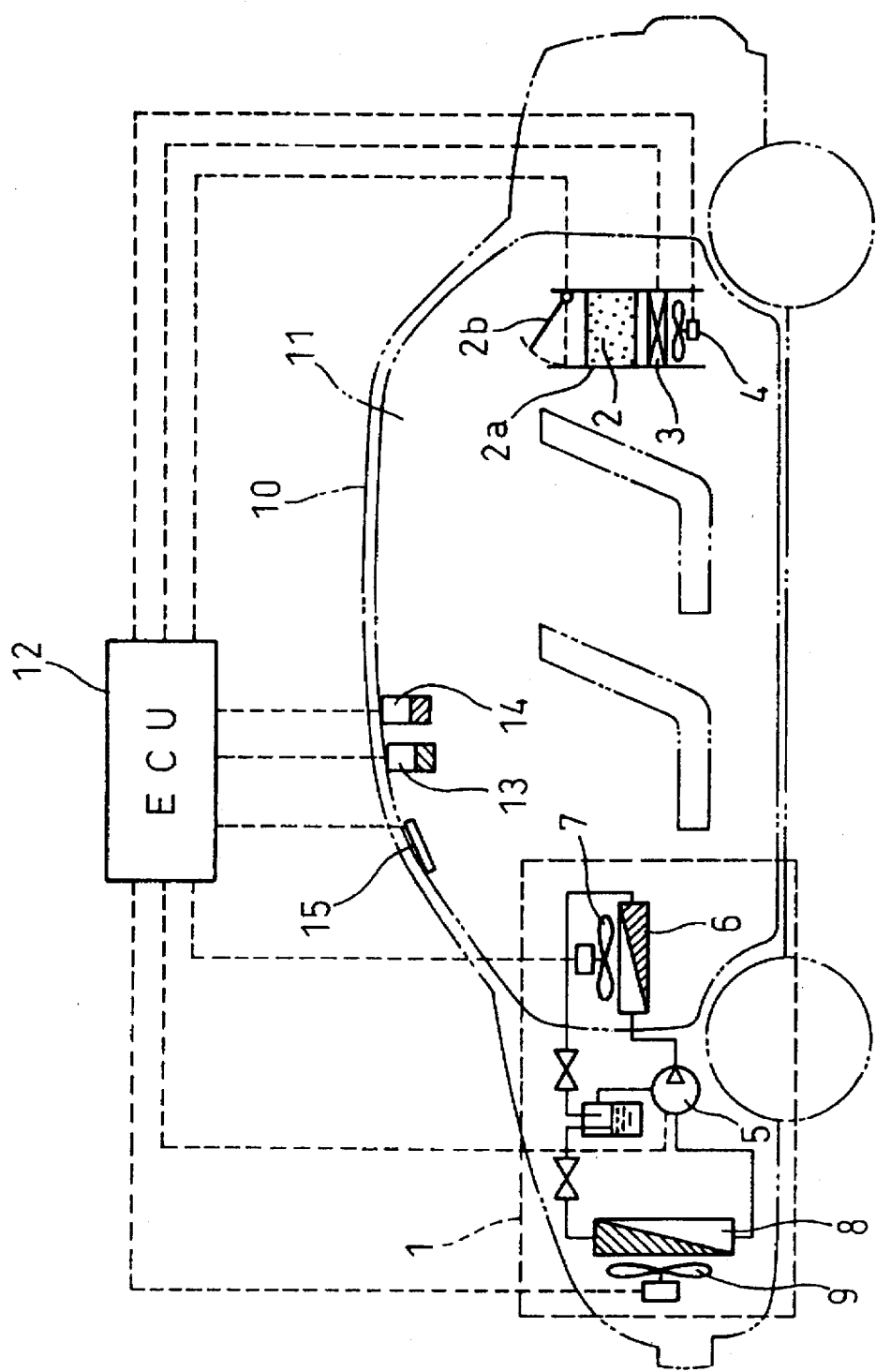
FIG. 3 is a schematic cross-sectional view of the configuration of a second embodiment of a car air-conditioner operated by the method of control of the present invention.

FIG. 3 shows an air-conditioner according to a second embodiment operated by the method of control of the present invention. The major part of this configuration is the same as that of the first embodiment shown in FIG. 1, so the same reference numerals will be given and overlapping explanations will be omitted. The characterizing feature of the second embodiment is that in addition to the configuration of the first embodiment, provision is made of a passenger compartment temperature sensor 13 for measuring the temperature Tr of the air in the passenger compartment 11, a passenger compartment humidity sensor 14 for measuring the humidity Hr of the air in the passenger compartment 11, and a surface temperature sensor 15 for measuring the surface temperature Tf of the window glass.

The operation of the second embodiment is basically similar to that of the first embodiment. In the first embodiment, however, it was necessary to determine in advance the warmup time, timing of start of regeneration, regeneration time, amount of ventilation, etc. for each model of car and to set that data in a ROM in the ECU 12, but in the second embodiment the temperature signals and the humidity signals detected by the passenger compartment temperature sensor 13 and passenger compartment humidity sensor 14 mounted in the passenger compartment 11 and the surface temperature sensor 15 attached to the window glass are input to the ECU 12 at each time to enable calculation of the condensation temperature Tc from the passenger compartment temperature Tr and the passenger compartment humidity Hr. The surface temperature Tf of the window glass and the condensation temperature Tc are compared. When the surface temperature Tf is lower than the condensation temperature Tc, the ECU 12 causes the amount of ventilation to be increased, while in the opposite case, it causes the amount of ventilation to be decreased.

Figure 4A:
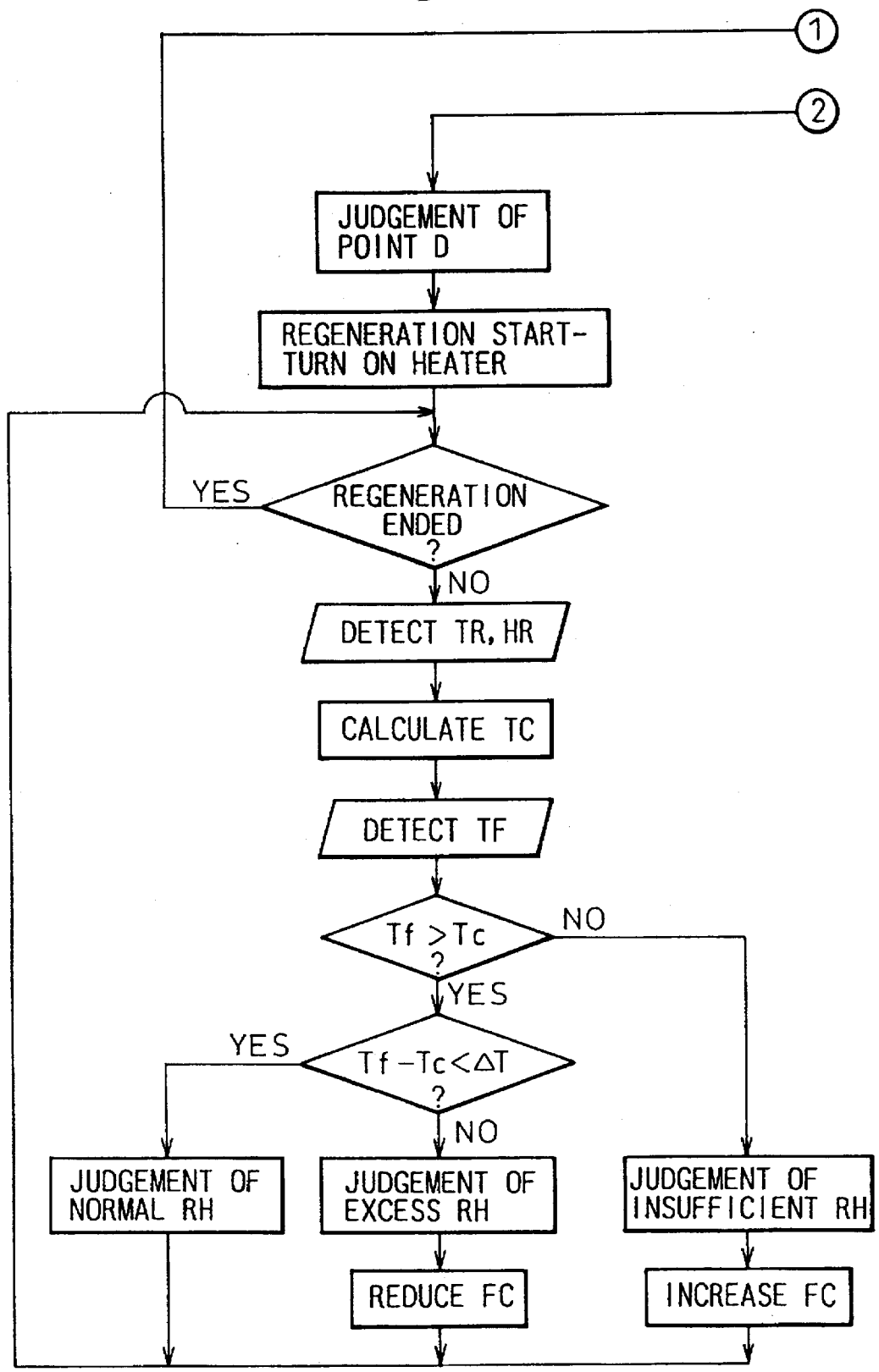
FIGS. 4A and 4B show a flow chart for explaining the operation of the second embodiment and therefore another example of the method of control of the present invention.
Figure 4B:
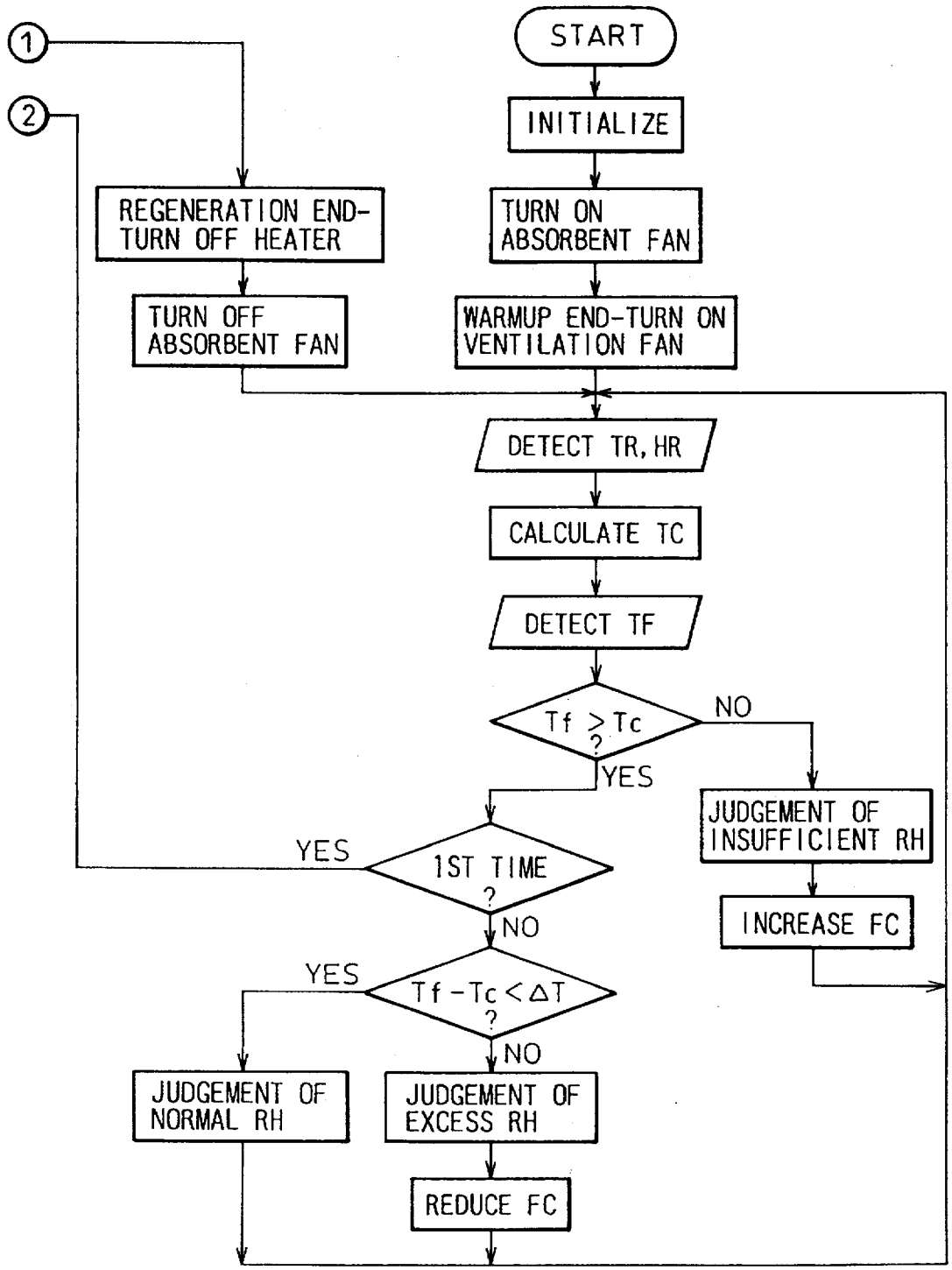

The control routine executed by the ECU 12 in the second embodiment is shown in detail in the flow chart of FIGS. 4A and 4B. The content of FIGS. 4A and 4B are clear and requires no explanation, so no explanation will be given, but note that Rh in the figure indicates the amount of dehumidification and Fc the amount of ventilation. Further, the "initialize" given at the first step of the flow chart means to decide on each occasion based on the data map the length of the time required for the startup of the heat pump system 1, that is, the warmup time, the regeneration time for the absorbent 2, and the temperature difference ΔT indicating how much higher to maintain the surface temperature Tf of the window glass than the condensation temperature Tc. Due to this, the air-conditioner of the second embodiment enables a similar effect to be achieved as that of the first embodiment without restriction as to the model of the car or the number of occupants in it.

We claim:

1. A method of control for a car air-conditioner which drives a fan for an absorbent to start dehumidification of the air in a passenger compartment by the absorbent with the start of a heating operation of a heat pump system, starts exchange of the air in the passenger compartment by a low level of ventilation at the time when the heat pump system finishes warming up, then supplies power to an absorbent regeneration heater so as to regenerate the absorbent, and stops the supply of power to the heater and the fan for the absorbent when the regeneration is completed.

2. A method of control for a car air-conditioner as set forth in claim 1, wherein additional ventilation is performed over the low level of ventilation for exactly a time for regeneration of the absorbent.

3. A method of control for a car air-conditioner as set forth in claim 1, wherein the regeneration of the absorbent is started immediately after the dehumidification by the absorbent is ended.

4. A method of control for a car air-conditioner as set forth in claim 2, wherein the regeneration of the absorbent is started immediately after the dehumidification by the absorbent is ended.

5. A method of control for a car air-conditioner as set forth in claim 1, wherein an electronic control unit determines the time for dehumidification by the absorbent in accordance with signals detected by a passenger compartment temperature sensor for measuring the temperature of the air in a passenger compartment, a passenger compartment humidity sensor for measuring the humidity of the air in the passenger compartment, and a surface temperature sensor for measuring the surface temperature of the window glass.

6. A method of control for a car air-conditioner as set forth in claim 2, wherein an electronic control unit determines the time for dehumidification by the absorbent in accordance with signals detected by a passenger compartment temperature sensor for measuring the temperature of the air in a passenger compartment, a passenger compartment humidity sensor for measuring the humidity of the air in the passenger compartment, and a surface temperature sensor for measuring the surface temperature of the window glass.

7. A method of control for a car air-conditioner as set forth in claim 3, wherein an electronic control unit determines the time for dehumidification by the absorbent in accordance with signals detected by a passenger compartment temperature sensor for measuring the temperature of the air in a passenger compartment, a passenger compartment humidity sensor for measuring the humidity of the air in the passenger compartment, and a surface temperature sensor for measuring the surface temperature of the window glass.

8. A method of control for a car air-conditioner as set forth in claim 4, wherein an electronic control unit determines the time for dehumidification by the absorbent in accordance with signals detected by a passenger compartment temperature sensor for measuring the temperature of the air in a passenger compartment, a passenger compartment humidity sensor for measuring the humidity of the air in the passenger compartment, and a surface temperature sensor for measuring the surface temperature of the window glass.

* * * * *